J. D. DAVIS.
MANUFACTURE OF DESICCATED MILK.
APPLICATION FILED OCT. 7, 1912.
1,070,781.
Patented Aug. 19, 1913.
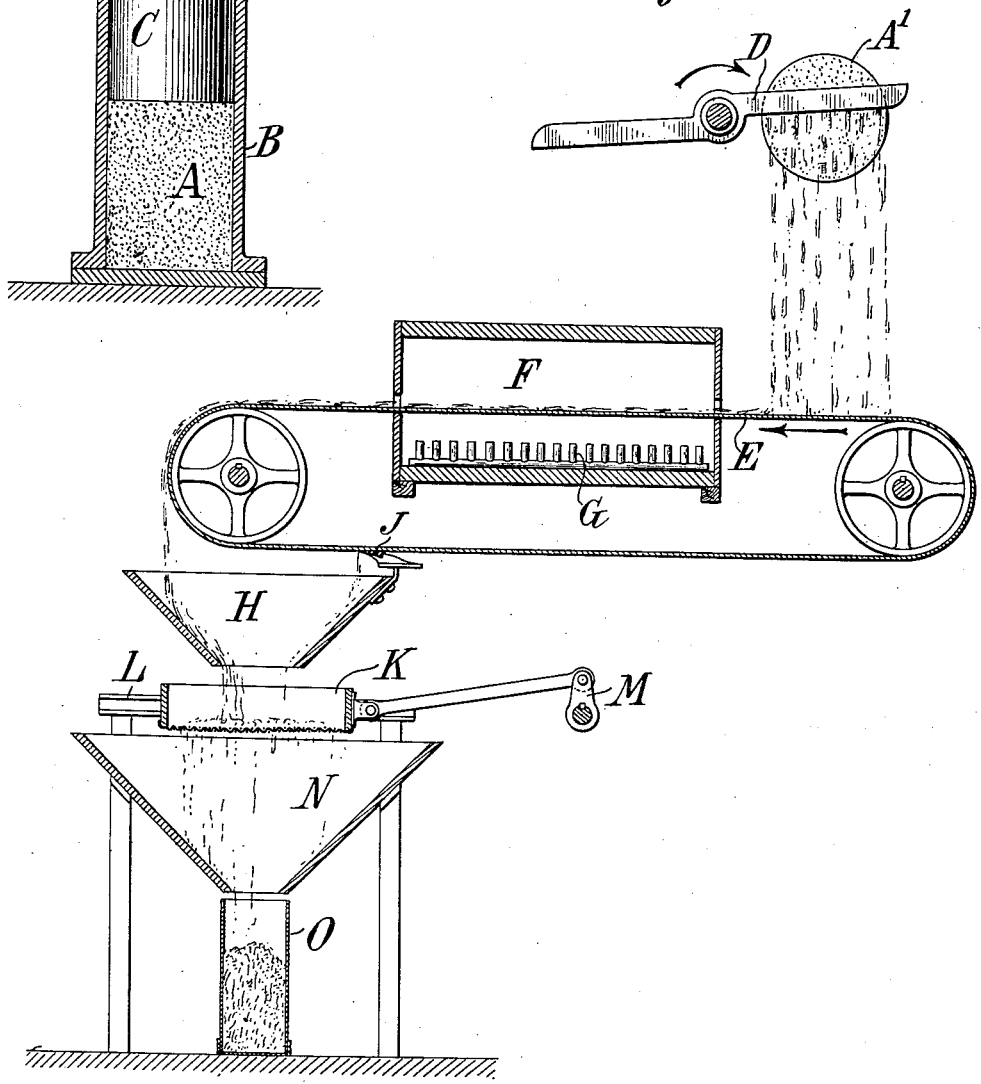
WITNESSES:
INVENTOR:
Jean D. Davis,
By Attorneys,

UNITED STATES PATENT OFFICE.

JEAN D. DAVIS, OF GREENWICH, CONNECTICUT, ASSIGNOR TO NATIONAL WHITE CROSS MILK COMPANY, OF JERSEY CITY, NEW JERSEY, A CORPORATION OF NEW JERSEY.

MANUFACTURE OF DESICCATED MILK.

1,070,781.  Specification of Letters Patent.  Patented Aug. 19, 1913.

Application filed October 7, 1912. Serial No. 724,365.

*To all whom it may concern:*

Be it known that I, JEAN D. DAVIS, a citizen of the United States, residing in Greenwich, in the county of Fairfield and State of Connecticut, have invented certain new and useful Improvements in the Manufacture of Desiccated Milk, of which the following is a specification.

This invention aims to provide a simple and reliable method of securing an improved form of desiccated milk. Desiccated milk as heretofore generally made is slow to dissolve. The chief difficulty in this respect is apparently due to the compactness and hardness of the minute grains or particles of the milk; and this difficulty exists even when the product is ground as fine as flour. By the present method I secure the milk in small flakes or shavings which are extremely thin, which occupy a much greater bulk per unit of weight than the former product, and which are more readily soluble in water. For this purpose I form the milk into a slab or cylinder or other shaped block (containing sufficient moisture to hold its shape), and shave off the face of the block and put the loose shavings through a drier to completely remove the moisture. The product is thus dried in the form ultimately desired. For example, the process may be carried out in detail as follows: The milk is first treated to remove a large volume of water, bringing it, say, to one-sixth of its original volume, by heating it and blowing air in large volume through it in the manner described fully in the patent of Campbell, No. 668,161, of February 19, 1901. The milk thus concentrated is then transferred to the interior of a revolving drum and subjected to hot air in the manner described in Campbell Patent No. 668,162, of Feb. 19, 1901. This second stage of the process may be continued until the milk is practically dry (containing, say, from 5 to 8 per cent. of water), and broken up into small granules, being then shipped or transferred to the desired point and slightly moistened for the subsequent operations; or this second stage of the process may be continued only to the point where the milk is solid, but still in a moist state. The milk thus slightly moistened or containing a portion of its original moisture is then treated in the manner illustrated in the accompanying drawings, of which Figure 1 is a diagrammatical section of a press, and Fig. 2 is a diagrammatical section of the shaving, drying and sifting apparatus.

The slightly moist product A is put in the press B and compacted by plunger C with a pressure sufficient to form a block about as hard as ordinary cheese. This block, marked A' in Fig. 2 (which at this time may contain about 10 per cent. of water) is then fed with a slow feed to a rotating knife D which shaves off the face of the block. The thickness of the shavings may be accurately regulated by the feed of the block to the knife, which may be so fine as to take off shavings 5/1000ths of an inch thick. The shavings fall upon a slowly traveling belt E which passes through a drying chamber F heated by a radiator G. The drying apparatus is of sufficient capacity to remove substantially all the moisture from the product in its loose, flaky form. The belt passing out of the drier deposits the material into a hopper H, a scraper J serving to remove any of the material which adheres to the belt. From the hopper H the material passes into a sifter K of the ordinary type used to sift flour and having a mesh of any desired size. The sifter is reciprocated in guides L by means of a rotating crank M. The material from the sifter falls into a hopper N, and thence into packages O placed beneath the hopper which are closed and preferably sealed at once. It is desirable that the product should be packed at once upon leaving the drier because its very porous consistency makes it slightly hygroscopic. The blocks or cakes A' should also be shaved off at once after they are formed and set, as the moisture in the material tends to cause deterioration; but such blocks can be kept in cold storage for a considerable time. The moistened material is allowed to stand about three hours in the press in order to secure the consistency necessary for the subsequent shaving operation.

It is better to first skim the milk and then reduce it to the solid form; and thereafter to add cream, milk or water, or a viscous material such as condensed milk, or a mixture of any of these, to secure the necessary moisture or viscosity and the content of fat which is desired in the final product. The addition of cream not only moistens the mass but also increases the content of butter fat in the final product. The addition of viscous condensed milk facilitates the adhesion of the particles when they are pressed together. Both cream and condensed milk may be added where the product desired and the dryness of the granules require such a double addition. If the amount of cream alone (or of cream and condensed milk) which is to be added to the granules is more than is necessary to moisten them, the product with the added cream may be further dried in the drum above referred to.

Instead of a rotating knife for shaving the block any other suitable turning or planing or shaving type of apparatus may be used. The same is true of the press and the drying and sifting apparatus illustrated. The process can also be varied considerably in detail by those skilled in the art without departing from the invention. The product of this process is flaky and highly porous, the flakes being broken into larger or smaller sizes according to the fineness of the sifter; and is very much better in this form than in the old form in which it was first thoroughly dried in granular form and then ground in a bolting mill.

The process in which the milk is first thoroughly dried and is subsequently moistened with cream, liquid milk or water, and then pressed and shaved has a commercial advantage in that the dried product can be easily made at dairy farms and shipped to one or more distant points for further treatment, because the dried ground product will keep in good condition much longer than if it were moist. Where moisture is subsequently added it is only necessary to soften the surfaces of the particles slightly in order to secure the desired cementing action under pressure. This method also makes it easier to secure the desired percentage of fat in the product by properly proportioning the quantity of cream added to the dried product.

The desiccation of the shaved flaky product is especially desirable where the product is to be kept a long time. Such complete desiccation, however, may be dispensed with where the product is to be used promptly as it is already sufficiently dry to keep for a few days without spoiling. Also the binding of the particles together with moisture may be practised not only upon milk first dried by the Campbell processes described, but also upon milk dried in small particles in any other known or suitable way.

What I claim is:—

1. The herein-described process of making a flaky, porous, desiccated milk which consists in concentrating the milk and reducing it to particles containing a small percentage of moisture, pressing it into a solid block, shaving it in thin shavings from said block, drying it in the form of loose shavings, sifting it to reduce the flakes to the desired size, and promptly packing and sealing the product to exclude moisture.

2. The herein-described process of making a flaky, porous, desiccated milk which consists in concentrating the milk and reducing it to particles containing a small percentage of moisture, pressing the same into a block, shaving thin shavings from said block, and drying the same in loose, flaky condition.

3. In the making of a flaky, porous, dry milk the process which consists in concentrating the milk and reducing it to particles containing a small percentage of moisture, pressing the same into a block and shaving thin shavings from said block.

4. In the making of a flaky, porous, dry milk the process which consists in adding to dried particles of milk sufficient moisture to cement them together under pressure, pressing the mass into a block and shaving thin shavings from said block.

5. In the making of a flaky, porous, dry milk the process which consists in adding to dried particles of milk sufficient cream to cement them together under pressure, pressing the mass into a block and shaving thin shavings from said block.

6. In the making of a flaky, porous, dry milk the process which consists in drying milk, adding cream thereto to increase the butter fat content of the finished product, drying to a point where the product will adhere together upon pressing, pressing the mass into a block, shaving thin shavings from said block and drying said shavings.

7. In the making of a flaky, porous, dry milk the process which consists in drying milk, adding thereto viscous condensed milk in quantity as to cause the particles to adhere together upon pressing, pressing the mass into a block, shaving thin shavings from said block and drying said shavings.

8. In the making of a flaky, porous, dry milk the process which consists in drying milk, adding thereto cream to increase the butter fat content and viscous condensed milk to cause the particles to adhere together upon pressing, pressing the mass into a block, shaving thin shavings from said block and drying said shavings.

In witness whereof, I have hereunto signed my name in the presence of two subscribing witnesses.

JEAN D. DAVIS.

Witnesses:
 GEO. G. W. NALL,
 ALICE J. O'NEILL.